United States Patent [19]

Sperry

[11] 3,770,905

[45] Nov. 6, 1973

[54] TRACKING ADJUSTMENT FOR MAGNETIC DISC RECORDER

[75] Inventor: John D. Sperry, Nevada City, Calif.

[73] Assignee: Arvin Industries, Inc., Columbus, Ind.

[22] Filed: June 27, 1972

[21] Appl. No.: 266,611

[52] U.S. Cl. .................. 179/100.2 CA, 340/174.1 C
[51] Int. Cl. .......................... G11b 5/56, G11b 25/04
[58] Field of Search ............ 179/100.2 Z, 100.2 CA, 179/100.2 P; 340/174.1 C, 174.1 F, 174.1 E; 274/4 H, 4 R, 11 A; 206/62 P

[56] References Cited

UNITED STATES PATENTS

| | | | |
|---|---|---|---|
| 3,646,261 | 2/1972 | Kinjo | 179/100.2 CA |
| 3,298,009 | 1/1967 | Domich et al. | 340/174.1 C |
| 3,202,974 | 8/1965 | Baillif | 340/174.1 F |
| 3,153,241 | 10/1964 | Ramrath et al. | 179/100.2 CA |
| 3,635,608 | 1/1972 | Crouch et al. | 179/100.2 Z |
| 3,416,150 | 12/1968 | Lindberg, Jr. | 340/174.1 C |
| 3,633,186 | 1/1972 | Lynott | 340/174.1 C |
| 3,631,419 | 12/1971 | Ho | 340/174.1 F |
| 3,593,327 | 7/1971 | Shill | 340/174.1 C |
| 3,432,169 | 3/1969 | Schroder | 179/100.2 Z |

*Primary Examiner*—Vincent P. Canney
*Assistant Examiner*—Alfred H. Eddleman
*Attorney*—Lawrence B. Biebel et al.

[57] ABSTRACT

In a magnetic disc recorder, the transducer is positioned radially of the record disc by having a mounting block movable on a lead screw or equivalent, which is in turn driven by a positioning motor. The transducer is separately movable, for example by a manual control, for purposes of aligning the transducer with a recorded track, to optimize the playback of a recorded signal. In the disclosed embodiment the lead screw is movable lengthwise to a limited extent to achieve the alignment adjustment.

4 Claims, 6 Drawing Figures

PATENTED NOV 6 1973 3,770,905

SHEET 1 OF 2

PATENTED NOV 6 1973 3,770,905

TRACKING ADJUSTMENT FOR MAGNETIC DISC RECORDER

CROSS REFERENCE TO RELATED APPLICATION

This application is related to copending application Ser. No. 266,582, filed June 27, 1972, entitled MAGNETIC DISC RECORDER AND CASSETTE, and assigned to the same assignee as this application and now abandoned.

BACKGROUND OF THE INVENTION

The invention relates to magnetic disc recorders, and particularly to provisions for proper tracking of one or more transducers with respect to a previously recorded track on a recorded disc. Most prior art disc magnetic recorders have not employed readily interchangeable, inexpensive record discs. Various proposals have been made in this respect, however, no provisions have been made for fine adjustment of the transducer head in order to obtain an optimum signal when replaying from an already recorded track. Particularly, where relatively inexpensive magnetic recording discs are to be used it is desirable to minimize the tolerance requirements of the interchangeable recording discs and the equipment for mounting and rotating them. This in turn introduces a need for suitable controls to adjust the tracking of the transducer with respect to discs already recorded, possibly not on the same apparatus used for replay.

In order to obtain the best signal to noise ratio on replay, it is desirable to optimize the playback signal, and for this purpose precise alignment of the transducer with respect to recorded tracks is required. For example, using a plurality of tracks on different circles to record separate video frames, it is relatively simple to maintain concentricity of the tracks with respect to an axis of rotation, by centering a hub member connected to the record disc with respect to the axis of rotation. However, when the disc is used on different apparatus for recording and playback, it is necessary either to provide a very precise mounting relation between the transducer, the mechanism for moving it to follow different tracks, and the axis of rotation, or else to provide some means for adjusting the transducer position to achieve the best tracking position. From the standpoint of simplicity, expense and ease of mass production the best means of production appears to be the latter, namely to provide an adjustment for achieving optimum tracking.

SUMMARY OF THE INVENTION

In accordance with the invention, a thin flexible recording media, a magnetic recording disc, is housed within a relatively thin cassette and includes a hub connected to the disc and accessible from the exterior of the cassette for rotation of the disc past a slot-like opening so that a transducer can be inserted to interface with different tracks on the disc. The feeding of the hub with respect to the cassette can have a rather large clearance, however, the hub includes some form of alignment device which cooperates with a drive hub in the deck to align the hub and the top disc with respect to an axis of rotation. The transducer is mounted to move along a radius of the disc, toward and away from the axis of rotation. In the embodiment disclosed, the transducer follows different circular paths, however, it is possible to have the transducer follow a cointiuous helical path if that is desired.

Since the disc may be recorded on a separate mechanism or deck, in order to align the transducer with the tracks, it is mounted in a block which is movable by a lead screw, which may be appropriately the positioning motor, such as a stepping motor, and the block is further movable, as by providing for a limited longitudinal movement of the lead screw within its mounting. This adjustment may be made manually for example, while observing the strength of the played back signal either through a suitable meter, or in the case of a video signal by observing a monitor, until the optimum tracking mechanism is received. Therefore, the primary object of this invention is to provide a precise tracking adjustment for a magnetic apparatus; provide such an adjustment in communication with a tracking control mechanism which is of simple and relatively inexpensive design and to provide such an adjustment in the form of a mechanism and which can be readily incorporated into a deck for magnetic disc records and is simple and easy to manipulate.

DESCRIPTION OF THE PREFERRED EMBODIMENT

Figure 1:
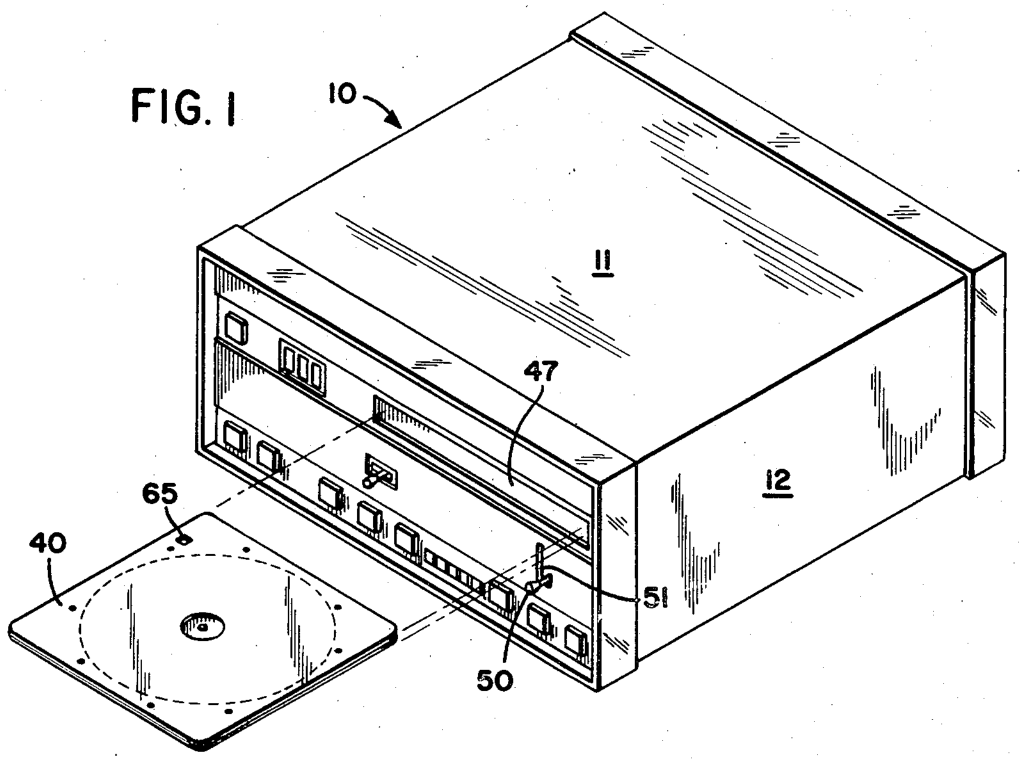
FIG. 1 is a perspective view of a magnetic recording system embodying the invention, showing a cassette which contains a recording media in position to be loaded into the housing of the device.
Figure 2:
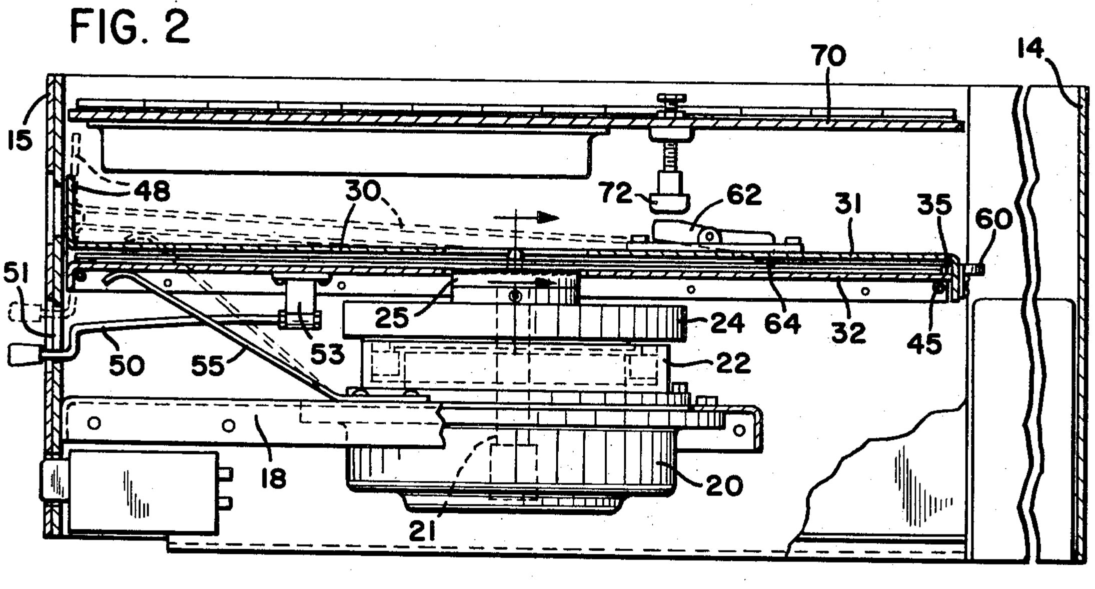
FIG. 2 is a cross-sectional view taken generally through the center of the housing, with some parts broken away or omitted for purposes of clarity.
Figure 3:
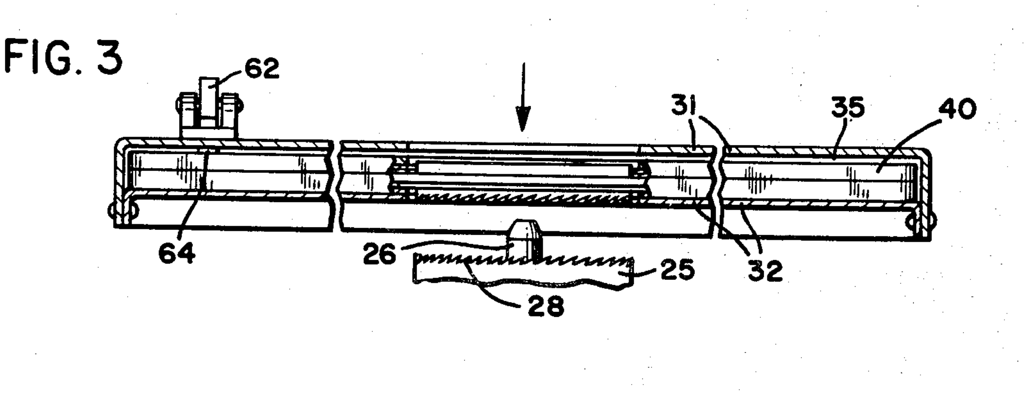
FIG. 3 is a cross-sectional view of the cassette carriage and related portions of the drive, taken on line 3—3 in FIG. 2.

Referring to the drawings, and particularly to FIGS. 1 and 2, the recording system provided by the invention is contained within a housing 10 having a top 11, sides 12, a rear panel 14 and a front panel or face 15. Within this structure there is fastened an inner mounting bracket 16 which is generally U-shaped in configuration, with its base portion resting behind the front panel 15, one of its sides adjacent to one side panel 12, and the other of its sides extending front to back of the housing between the sides forming a partial partition. A base panel 18 is secured to all three sides of the bracket 16 and is supported within the housing elevated somewhat above its bottom.

The base panel 18 provides support for a drive motor 20 having an output shaft 21 which extends vertically, its axis of rotation being generally parallel to the front and rear of the housing. Attached to the motor shaft 21 is a tachometer 22 which forms part of a control loop to regulate the motor output speed. Above the tachometer, also fastened to shaft 21, there is a flywheel 24, and immediately above it is the output or drive hub 25. The end of shaft 21, in the particular construction shown, extends somewhat through the drive hug and provides a locating means 26 which functions to align the drive hub with elements to be driven. The top or upper face of drive hub 25 has a plurality of radially extending undercut teeth 28 which face coaxially of the shaft 21 arranged in a circle around the face of drive hub 25. These teeth rotate in a fixed plane when motor 20 is running, and the elements of a recording cassette are brought into contact with the drive hub.

Immediately above the motor and its drive hub there is a cassette receiving carriage 30 which comprises top and bottom walls 31 and 32 secured together to define a thin elongated chamber 35 into which a thin rectangular cassette 40 may be inserted. Details of the cassette are not a feature of the invention. For purposes of the present explanation, it should merely be noted that the cassette includes an exposed rotatable driven hub, also having undercut teeth, the driven hub constructed as a complement to the driving hub 25 so that the two hubs may readily engage for the purpose of moving a recording media within the cassette 40. In one successful embodiment, the cassette 40 is constructed as a hollow essentially rigid member of about 10 inches square, having a thickness of less than one-fourth inch.

The carriage 30 is supported at its rear by a pivot or hinge rod 45 which extends through suitable bushings 46 in the sides of the support bracket 16. This supports the carriage for pivotal movement between a playing position which is shown in full lines in FIG. 2, and a loading or unloading position shown in dash lines, where the cassette receiving chamber 35 is generally aligned with a loading opening 47 in the front panel 15. In the playing position an upward extension 48 of the carriage top wall 31 provides a cover for the opening 47. A control handle 50 extends through a slot 51 in front panel 52 and is fastened to a small bracket 53 on the bottom wall 32 of the carriage. Leaf spring 55, which is fixed to the base panel 18, presses against the underside of carriage 30, urging it toward the loading position. The slot 51 includes a lateral extension into which a portion of the handle 50 can engage, locking the carriage in the playing position.

A retaining mechanism functions to locate the cassette in the chamber 35 against the force of an ejector spring 60 (FIG. 4) which is secured to the rear of carriage 30 and includes a portion 61 projecting into the rear of the chamber 35 to engage and press against an edge of the cassette 40. The retainer mechanism includes a latch 62 (FIG. 2) having a corner 64 (FIG. 4) which is normally urged through an opening in the upper wall 31 of the carriage to engage within a notch 65 formed in the cassettes 40. The latch member 62 is pivotally mounted on the top wall 31 of the carriage and urged into the retaining position shown in FIG. 2. An upper panel 70, supported beneath the top 11 of the housing, has a depending stop 72 aligned with the latch member 62 such that when the carriage is raised to the loading position, the latch member 62 will engage stop 72 and move the end 64 out of the notch in the cassette, permitting the ejector spring 60 to eject the cassette partially through the loading opening 47 as the open front end of the carriage comes into alignment with the loading opening. To reverse the procedure for loading, it is necessary only to hold the cassette in the chamber 35 as the carriage begins to be lowered, and the retainer mechanism will engage the notch 65 as the carriage leaves the loading position.

Figures 4, 5, 6:
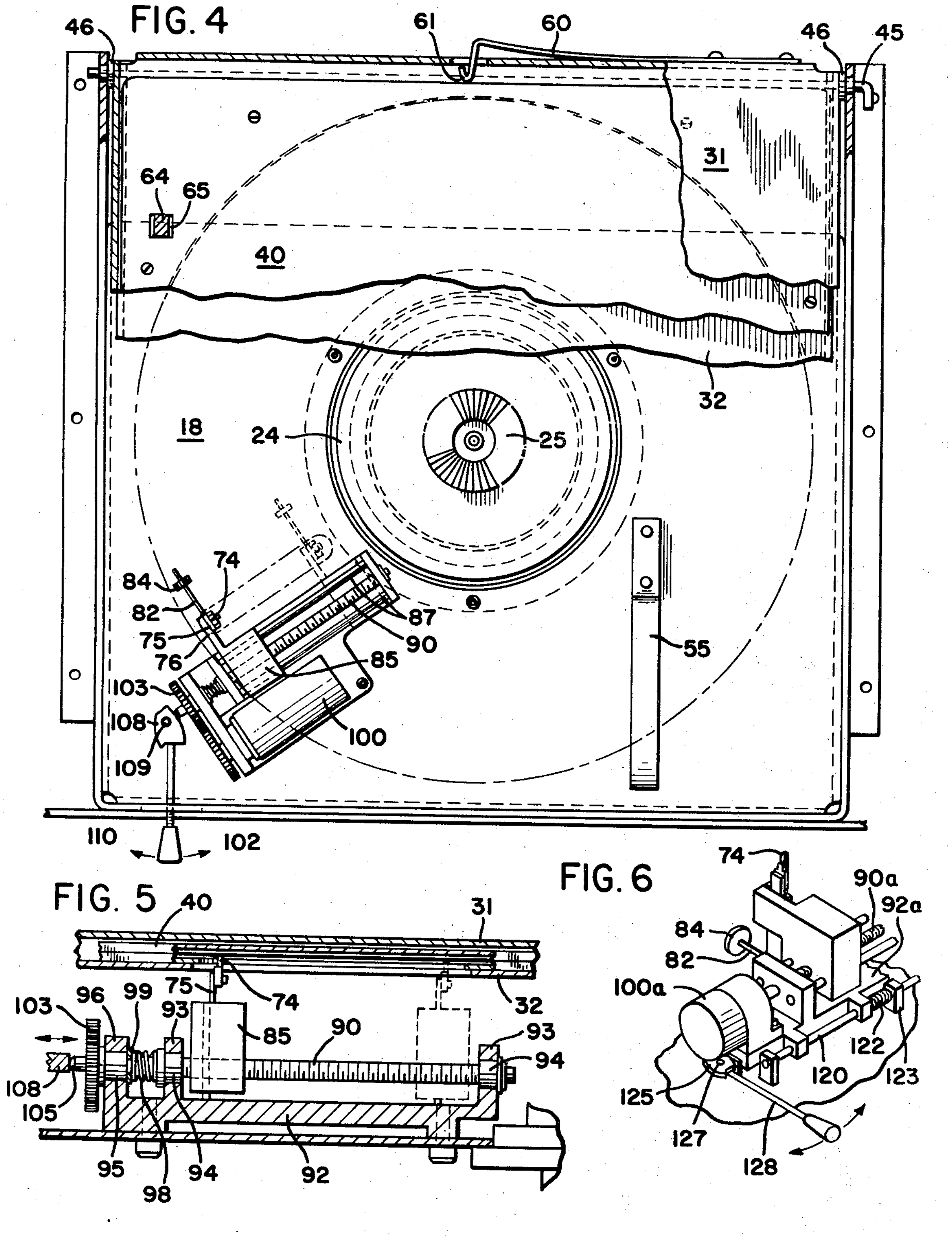
FIG. 4 is a plan view of the central portion of the carriage and drive mechanism, with portions of the carriage and of the cassette broken away to show the face of the drive hub and the general arrangement of the transducer mounting and controls.
FIG. 5 is an enlarged cross-sectional view of the mounting and controls for the transducer, showing the carriage and a cassette therein in the playing position.
FIG. 6 is a somewhat diagrammatic view of a modified form of the invention.

Referring to FIGS. 4 and 5, a transducer 74, preferably in the form of a single magnetic recording/playback head having a very narrow width and a small gap width in the order of 40 microinches, is mounted for cooperation with the recording media (e.g. disc) within the cassette 40 when the carriage supports the cassette in the playing position as shown particularly in FIG. 5. The transducer 74 is suitably mounted on a supporting slide 75 that is vertically movable within a support 76.

A control arm 82 is pivotally mounted to the support 76, and a counterweight 84 is threaded into the outer end of the arm 82. Adjustment of the counterweight toward and away from the hinge block 83 determines the force with which the transducer 70 is urged upward to interface with the recording media in the cassette.

The entire transducer holding mechanism is supported for movement in a direction radially of the cassette by means of a main supporting block 85 to which the support 76 is fastened. This block contains suitable holes which receive parallel guide rods 87 that support the block 85 for precise sliding movement. A lead screw 90 is threaded to a nut (not shown) fixed within the block 85, such that rotation of the lead screw produces a translational movement of the block 85 radially of the carriage 30 (and a cassette therein) as shown generally in FIG. 4 and FIG. 5. The transducer and its supporting mechanism is shown in full lines in the outermost position and in dash lines in the innermost position, indicating generally the range of movement of the transducer.

The rods 87 and lead screw 90 are supported parallel to each other on a bracket 92 which includes a pair of upstanding ears 93 to which opposite ends of the rods 87 are secured. The lead screw 90 is mounted within bushings 94 within these ears, and extends through a further bushing 95 at the outermost end of the bracket, that bushing being supported within a further upstanding ear 96.

The lead screw is supported for limited longitudinal movement within the bushings, being shown in its outermost position where a spring 98 presses against a snap ring 99 on the lead screw, biasing it to that position. A stepping motor 100 is suported on the bracket to one side of the rods and block 85, as shown in FIG. 4, and is connected to rotate the lead screw through a pair of meshing gears 102 and 103, the former of which is fixed to the output shaft of the stepping motor, while the gear 103 is fixed to the end of the lead screw 90.

In accordance with the invention the tip 105 of the lead screw projects beyond gear 103 and engages with an adjustment cam 108 which is rotatably mounted on a supporting pivot pin 109 extending upward from the base panel 18. An adjustment arm 110 extends from cam 108 through an aperture in the front panel 15 (and a corresponding aperture in the front of subpanel 16) to control rotation of cam 108, which in turn presses against the end of lead screw 90 and provides a fine adjustment of the position of block 85 and the transducer mechanism, which is supported from the block.

In a typical use of this feature, the output of the transducer 74 may be connected to a suitable amplifier and a monitor (not shown) to display a video signal recorded on the media within cassette 40. In one embodiment, a plurality of frames of video information may be recorded on the media, and during playback the arm 110 can be adjusted while observing the scene on the monitor to achieve the best signal. It is also possible to use a signal strength indicator to provide a reference for adjustment of this fine control arrangement.

With reference to FIG. 6, other means for providing the fine tracking adjustment are also possible in accordance with the invention, and as shown in this figure, the bracket 92*a* which mounts the lead screw and its drive motor are supported on rods or tracks 120, for movement in a direction radially with respect to the record disc. In this instance the lead screw 90*a* is mounted in a fixed position within its supporting bracket, and its position motor 100*a* can be coupled directly to the end of the lead screw as shown.

A spring 122 acts between the bracket and an abutment 123 on the base panel 18, and a cam 125 is also supported on the base panel at the other end of the bracket, through a pivot pin 127. Adjustment of the handle 128 will rotate the cam to move the entire bracket against the force of the spring, to produce the same desired tracking adjustment.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In a magnetic disc recorder,
- a disc of magnetic recording media having at least one recording surface,
- drive means connected for rotating said disc about an axis,
- a transducer cooperating with said disc to record and/or playback a signal,
- a support block carrying said transducer,
- means supporting said block for movement radially of said disc including a lead screw connected to cause translational movement of said block across said recording surface of said disc to follow one or more tracks on said disc,
- a support bracket for said lead screw,
- a motor connected to rotate said lead screw,
- and manually operated adjusting means connected to move said lead screw along its axis to cause movement of said block independent of lead screw rotation for correction of the alignment of said transducer with a track on said disc.

2. Apparatus as defined in claim 1, wherein said adjusting means includes a cam engaging one end of said lead screw, and
- an arm connected to move said cam for fine adjustment of the transducer position with respect to said disc.

3. Apparatus as defined in claim 1 wherein said bracket is mounted for movement parallel to the axis of said lead screw,
- a cam engaging said bracket,
- means for moving said cam to adjust the position of said bracket, and
- means urging said bracket into contact with said cam.

4. In a magnetic disc recorder having
- a thin flexible disc of magnetic recording media,
- drive means connected for rotating said disc about an axis,
- a transducer cooperating with said disc to record and/or playback a signal from a track on said disc,
- a support block carrying said transducer,
- means supporting said block for movement including a rotatably driven lead screw causing translational movement of said block along a radius of said disc to follow one or more tracks on the rotating disc,
- a support bracket for said lead screw,
- and manually operable adjusting means connected to move said lead screw along its axis over a limited range independent of lead screw rotation for aligning said transducer with a track on said disc.

* * * * *